(12) United States Patent
Kelly (10) Patent No.: US 7,292,995 B1
(45) Date of Patent: Nov. 6, 2007

(54) SYSTEM AND METHOD FOR PROVIDING COMPENSATION TO LOAN PROFESSIONALS

(76) Inventor: Keith Kelly, 3933 N. 27th Rd., Arlington, VA (US) 22207

( * ) Notice: Subject to any disclaimer, the term of this patent is extended or adjusted under 35 U.S.C. 154(b) by 0 days.

(21) Appl. No.: 11/672,770

(22) Filed: Feb. 8, 2007

Related U.S. Application Data (63) Continuation of application No. 11/467,426, filed on Aug. 25, 2006.

(60) Provisional application No. 60/800,437, filed on May 16, 2006.

(51) Int. Cl.
*G06Q 40/00* (2006.01)
(52) U.S. Cl. .......................... 705/35; 705/40
(58) Field of Classification Search ............. 705/14–42
See application file for complete search history.

(56) References Cited

U.S. PATENT DOCUMENTS

| | | | |
|---|---|---|---|
| 5,878,404 A | | 3/1999 | Stout, Jr. et al. |
| 5,966,699 A | * | 10/1999 | Zandi .......................... 705/38 |
| 2001/0056397 A1 | | 12/2001 | Kelly et al. |
| 2002/0019805 A1 | | 2/2002 | Kalotay |
| 2002/0046158 A1 | | 4/2002 | Kelly et al. |
| 2002/0111901 A1 | | 8/2002 | Whitney |
| 2002/0128963 A1 | | 9/2002 | Madden |
| 2003/0144943 A1 | | 7/2003 | Zivan |
| 2004/0193439 A1 | | 9/2004 | Marrott |
| 2005/0108152 A1 | | 5/2005 | Tsoa-Lee et al. |
| 2005/0273458 A1 | * | 12/2005 | Adams .......................... 707/1 |
| 2006/0184450 A1 | | 8/2006 | Ely et al. |

FOREIGN PATENT DOCUMENTS

| | | |
|---|---|---|
| EP | 1647933 A1 | 4/2006 |
| WO | 2005029371 A2 | 3/2005 |
| WO | 2005/124643 A2 | 12/2005 |

OTHER PUBLICATIONS

Sanders, John, "UK Life Companies Rocked by Govt Rule Changes," Reuters News, pp. 83-84 (Jul. 1993).
"Press Digest-Australian Business News," Reuters News, pp. 17-19 (Dec. 2004).
US Department of Labor, Bureau of Labor Statistics (Occupational Outlook Handbook) http://www.bls.gov/oco/ocos018.htm, pp. 1-8.

(Continued)

*Primary Examiner*—Frantzy Poinvil
(74) *Attorney, Agent, or Firm*—Rothwell, Figg, Ernst & Manbeck (57) ABSTRACT

A system and method for providing a compensation program associated with a modifiable mortgage is disclosed which provides incentives to encourage a sales force to originate a modifiable mortgage. In one aspect of the invention, the compensation program calculates an annuity to be paid to an appropriate sales force member based on the principal, interest, and/or service income of a modifiable mortgage. In another aspect of the invention, the compensation program provides a commission calculation to be paid based on a triggering event such as, for example, each time the interest rate on a modifiable mortgage is lowered. The compensation program of the present invention may also include both the annuity compensation and the commission compensation as incentives to originate the modifiable mortgage.

4 Claims, 7 Drawing Sheets

OTHER PUBLICATIONS

Bancgroup Mortgage Corporation, Inc., http://www.bancgroup.org/compensation.htm: pp. 1-2.

O'Brian, Bridget, "Those Who Switch Annuities Should Be Sure of the Benefits," Dow Jones Online News, pp. 99-101 (Dec. 1997).

"A Report to Asic on the Finance and Mortgage Broker Industry," The Consumer Credit Legal Centre (NSW) Inc., pp. 1-142 (Mar. 2003) http://www.asic.gov.au.

Vartan, Vartanig G., "Market Place; Mutual Funds: A New Twist," The New York Times, pp. 317-318 (Jun. 1983).

Kelleher, Ellen, "Fixing A Fair Fee For Finance Advice New 'Menus' of Charges May Help Clients to Make the Right Choice," Financial Times, pp. 1-2 (Aug. 2006).

Harney, Kenneth R., "Freddie Mac's "Modifiable Mortgage" Could be the Rage the Next Time Interest Rates Drop," Realty Times, (2 pages) (Mar. 2002).

Sinnock, Bonnie, "Some Find Loan modifications Welcome, Others Are Wary," National Mortgage News, (p. 5) (Mar. 4, 2002).

Sichalman, Lew, "Refinancing—It's Not Just for Low Rates Anymore; Housing Scene," BMMG (Aug. 2002) (3 pages).

Kalotay, Andrew, "Guest Column: Taking The Friction Out Of Saving Interest" BondWeek, 23(28): 8-9 (Jul. 14, 2003).

"Freddie Mac Announces Two New Prefixes For PC Securities Under The Company's New Modifiable Mortgage Offering" http://www.freddiemac.com/news/archives2002/modmort_022202.htm (Feb. 22, 2006) (1 page).

Kalotay et al., "Ratchet Bonds: Maximum Refunding Efficiency At Minimum Transaction Cost," Journal of Applied Corporate Finance, 12(1): 40-47 (1999).

Morse, Neil J., "Picking up crumbs," Mortgage Banking, 63(6): 111-112 (2003).

Sibayan, Karen, "Freddie Mac's new modifiable mortgage: Is the new kid on the block hot or not?" Asset Securitization Report (Mar. 4, 2002) (3 pages).

ANONYMOUS, "'Modifiable Mortgage' Pits Servicers Against Orignators," Mortgage Servicing News, p. 10 (Jun./Jul. 2002).

Finkelstein, Brad, "The Modification Mystery; The GSE's new modification mortgage programs could take the refi business out of your pocket." Broker Magazine, pp. 10-12 (Jun./Jul. 2002).

De Reza, Chris, "Freddie modifies the mortgage," Real Estate Finance Today, 19(9): 6 (Mar. 4, 2002).

Adams, John, "Customer Management: Those Rate Cuts Might Be Working After All; Refis explode despite an ill-conceived lack of retention marketing," Financial Services Marketing, pp. 1, 25 (Jan./Feb. 2002).

"Mortgage Funding, Gold Perspectives" http://www.freddiemac.com/mbs/data/gp_spring_2002.pdf (Spring 2002) (6 pages).

"Countrywide Looking to Stir Up Fixed-Rate Market (Countrywide Home Loan is launching its eEasy Rate Reduction Plan, company's new no-refinance loan initiative; program is available to all who apply for fixed-rate conventional plan)," Mortgage-Backed Securities Letter, 14(46) (Nov. 29, 1999) (3 pages).

Stark, Judy, "Loan Company Introduces eEasy Instant Refinance," St. Petersburg Times, p. 1F (Nov. 27, 1999).

Hochstein, Marc, "High Interest Rates Inventively Priced Loans," American Banker, 164(244): 11 (Dec. 22, 1999).

"ARMs from Countrywide, Green Point Only Go Down (Countrywide Credit Industries and Greenpoint Financial Corp each offer adjustable rate mortgage options that only adjust downward)," American Banker, 164(228): 1 (Nov. 30, 1999).

Wallace, Evelyn, "Fannie Mae Offers a New Mortgage Allowing Refinancing at Lower Rate," Mortgage Securities, 4 (51): 9 (Dec. 21, 1987).

* cited by examiner

SYSTEM AND METHOD FOR PROVIDING COMPENSATION TO LOAN PROFESSIONALS

CROSS REFERENCE TO RELATED APPLICATION

This application is a continuation of application Ser. No. 11/467,426, filed Aug. 25, 2006, which also claims the benefit of Provisional Application Ser. No. 60/800,437, filed May 16, 2006, which is incorporated herein by reference.

BACKGROUND OF THE INVENTION

1. Field of the Invention

The present invention relates to systems and methods for providing compensation to loan professionals and, more specifically, to providing a compensation program associated with modifiable mortgages which provides incentives to encourage a sales force to promote and originate modifiable mortgages.

2. Description of the Related Art

A lending institution, such as a bank, provides a loan to a debtor in return for periodic time payments at a set rate of interest. The time payments are due at predetermined payment intervals, typically every month, during the period or the term of the loan. The term is sometimes defined by the number of time payments. Part of each time payment made by the debtor is generally allocated to paying interest on the loan, and the remainder of the payment is allocated to reducing the amount owed, known as the principal balance of the loan, and any escrow deposits. Interest to be collected on the loan is often front loaded. This means that the portion of a payment, made by a debtor, which is allocated to interest will decrease over the term of the loan, while at the same time the portion of the payment applied to the principal will increase. The reduction in the principal balance by the time payments is known as amortization. Known methods of calculating interest rates and amortization payments are disclosed in "The Mathematics of Investing: A Complete Reference" by Michael Thomsett, pp. 23-40.

Financial loans (such as mortgages) may be classified as fixed-rate or variable-rate. In a fixed-rate loan, a prevailing interest rate at the time the loan is made determines the rate of interest for the entire term of the loan. In a variable-rate loan, a prevailing interest rate at the time the loan is made determines the initial rate of interest. However, at set dates the interest rate of a variable-rate loan is adjusted in accordance with a time-varying interest-rate index, such as the rate of interest payable on Treasury Bills.

Interest-rate indices typically fluctuate several times a year, and may fluctuate by substantial amounts during the term of a loan. Such changes in interest rates are beyond the variable-rate debtor's control, and may be to his or her advantage or detriment depending on whether the interest rate on the adjustment date is higher or lower than the mortgage's initial interest rate.

A mortgage servicer is an entity who is paid a fee to collect the payments from the mortgagor (borrower) and pay them to the mortgagee (lender). The fee collected is typically called a servicing income, servicing revenue, or servicing fee. There may be other terms for this fee. Mortgage servicing companies collect servicing fees as compensation for the collection and processing of mortgage payments.

A debtor having a fixed-rate loan may find that after receiving a loan at a fixed rate of interest, interest rates decrease substantially below the fixed interest rate associated with his or her loan. Naturally, the debtor prefers a loan with a low rate of interest so that the time payment amount will be as low as possible. Unfortunately, a drawback of a fixed-rate loan is that the debtor cannot automatically take advantage of decreases in interest rates. On the other hand, the fixed-rate debtor is not adversely affected by increases in interest rates which would negatively impact a variable-rate debtor.

To lower the mortgage payment in light of a decrease in interest rates, the mortgagor must refinance his or her loan. Refinancing a loan consists at least of the following steps: re-applying for the loan, re-qualifying for the loan, and signing a new loan agreement at the lower rate of interest. Refinancing of a loan involves a number of mandatory fees, such as fees paid to the lending institution, attorney's fees, and title searcher's fees. Therefore, refinancing is not cost effective to the debtor unless interest rates have decreased enough that savings from lower mortgage payments will offset the initial monetary expenditure of refinancing the mortgage. Mortgage servicing companies are adversely affected when mortgagors refinance their mortgages in order to take advantage of interest rate drops, because refinancing of a mortgage pays the mortgage in full thereby eliminating future earned interest on the mortgage and the accompanying servicing fee revenue.

In recent years par plus pricing has become very popular for refinancing mortgages. Par plus pricing is where a lender, in exchange for a higher rate of interest, provides a credit to the borrower which can be used to pay for the borrower's closing costs associated with refinancing. In essence, par plus pricing allows borrowers to lower the interest rates on their mortgages, through refinancing, without having to pay the associated fees at closing. This allows the mortgagor to lower his or her interest rate even if a small interest rate percentage drop would not have offset the monetary cost of traditional refinancing. Loan officers refinancing their current customers using par plus pricing are paid a commission on each refinance. A side effect of par plus pricing has been unusually high prepayment speeds on mortgages. High prepayment speeds negatively affect mortgage servicers and mortgage investors by lowering both the interest collected over time and the revenue generated through the mortgage servicing fee.

U.S. Pat. No. 5,878,404 is directed to a system and method for managing the amortization of a loan which automatically resets the rate of interest stored in memory in response to the debtor's election, yet holds the rate of interest fixed in the absence of such an election. In this patent application, a mortgage which can have its interest rate lowered without refinancing, as disclosed in U.S. Pat. No. 5,878,404, will be called a modifiable mortgage. The use of modifiable mortgages increases the customer retention rates for mortgage servicers and mortgage investors by eliminating the need to refinance mortgages in order to take advantage of lower interest rates. In essence, if a person had a mortgage whereby interest rates could be lowered without refinancing, such person may be less inclined to leave his or her current mortgage servicer.

Mortgage companies employ loan officers to originate mortgages. Compensation is paid to loan officers in the form of commissions for the origination of mortgages. Further, loan officers are typically paid a full commission when they refinance their current customers. When interest rates decline, par plus pricing provides loan officers the opportunity to earn a commission each time a customer refinances the same property. However, not all involved parties benefit from the refinancing of mortgages. Higher prepayment speeds adversely impact mortgage investors because their original investment is repaid earlier than expected. Servicing companies who collect payments on behalf of the investor also are adversely impacted because the servicing income generated is stopped when the loan is paid off.

A modifiable mortgage helps mortgage servicing companies retain their customers while at the same time helping to prevent mortgages from being paid off at faster than expected intervals. However, mortgage companies face a problem trying to get their salespeople to promote and originate (or sell) modifiable mortgages. The problem is that, under traditional compensation schemes, loan officers may earn less commission from modifiable mortgages than more conventional mortgage types. In particular, if a modifiable mortgage is offered to the borrower, a refinancing is less likely to occur and the loan officer does not receive additional compensation because a new refinanced loan is typically not originated. Loan officers therefore may not be incentivized to promote and sell modifiable mortgages because doing so may decrease the amount of income a loan officer could make when compared to selling other mortgage types, such as par plus pricing loans, which have a greater likelihood of being refinanced.

Accordingly, there is a need for compensation systems and methods which provide incentives to encourage a mortgage sales force to promote and sell modifiable mortgages which would benefit the mortgage sales force, mortgage servicers and mortgage investors.

SUMMARY OF THE INVENTION

It is an object of the present invention to overcome the problems discussed above by providing a compensation program associated with a modifiable mortgage which provides the proper incentives to encourage a mortgage sales force to originate modifiable mortgages.

It is a further object of the present invention to provide a compensation program associated with a modifiable mortgage which calculates an annuity compensation, to be paid to an entity in connection with the origination of a modifiable mortgage, based on the servicing income, loan amount, principal balance and/or interest associated with a modifiable mortgage for a specified period of time, i.e., the life of the loan or other certain period of time.

It is a further object of the present invention to provide a compensation program associated with a modifiable mortgage which provides a commission to be paid upon the occurrence of a triggering event such as, for example, each time the interest rate on a modifiable mortgage is lowered.

It is a further object of the present invention to provide a compensation program associated with a modifiable mortgage which provides both the annuity compensation and the commission compensation, which is paid in response to a triggering event.

The compensation methods and systems in accordance with the present invention may be carried out by a lender, bank, mortgage servicer or other mortgage provider using a conventional computer or the like. Furthermore, the compensation calculation system and process does not need to conduct highly complex calculations, and software used as part of the method and system can be effectively run on a mortgage servicer's computer or may be implemented without the use of a computer.

In one embodiment, the annuity compensation system and method of the present invention is designed to calculate the servicing income associated with a modifiable mortgage. The system and method is further designed to calculate a percentage of the servicing income which will be paid as compensation in the form of an annuity to loan officers, branch managers and/or other appropriate parties associated with the sale of the modifiable mortgage. The commission compensation system and method of the present invention is also designed to calculate a commission paid to a loan officer each time a triggering event occurs, such as, for example, when an interest rate is lowered on a modifiable mortgage.

In another embodiment, a method of compensating an individual in connection with the origination of a modifiable mortgage is disclosed which comprises the steps of: determining an annuity compensation amount in connection with the origination of the modifiable mortgage; determining a payment schedule over which the annuity compensation amount will be paid to the individual; calculating an annuity payment amount to be paid to the individual based on the annuity compensation amount and the payment schedule; and paying the annuity payment amount to the individual in accordance with the payment schedule.

In accordance with another aspect of the present invention, a system and method for calculating an annuity value for compensation purposes based on the annual mortgage servicing income associated with a modifiable mortgage is disclosed which comprises the steps of: inputting borrower specific information including borrower name, address the loan is secured to, loan number, and/or any other pertinent information associated with the modifiable mortgage; inputting the entity and/or person who will receive annuity compensation; inputting the loan amount; calculating and inputting the annual servicing income; calculating the percentage of annual servicing income which will be paid as an annuity; setting the length of time the annuity is to be paid, i.e., life of loan or certain number of years; and designating and paying out annuity to appropriate entities and/or persons.

In another embodiment of the present invention, a system and method for managing the amortization of a loan to a debtor and compensating loan professionals in a data processing system is disclosed which comprises the steps of: storing in a memory data identifying the debtor, the amount of the loan to the debtor, the principal balance of the loan an initial rate of interest payable on a principal balance of the loan and the term of the loan; recording in memory information identifying time payments received from the debtor for principal and interest on the loan as the payments are made; tracking and outputting the reduction in the principal balance of the loan and storing in the memory the principal balance in response to the time payments; resetting the initial rate of interest on the principal balance to a new rate of interest in response to the debtor's election; maintaining the initial rate of interest for the balance of the term of the loan in the absence of the debtor's election and the resetting of the rate of interest inputting borrower specific information; determining an interest amount to be paid by the debtor on the principal amount oft the loan; calculating an annual servicing income associated with the servicing of the loan; calculating annuity compensation based on a defined percentage of at least one of said amount of the principal balance of the loan, the interest amount or said annual servicing income; calculating an amount of commission compensation to be paid upon the occurrence of a triggering event; and designating and paying out the annuity compensation and the commission compensation to the at least one appropriate entity in connection with the origination of the loan.

In yet another aspect of the invention, a system for managing the amortization of a loan to a debtor and applying a compensation package to the management system includes memory, a data input module, a module for tracking principal reduction, a rate adjustment option module, an annuity compensation module, and a commission compensation module. The memory stores data identifying a debtor, the amount of a loan to the debtor, the principal balance of the loan, a rate of interest payable on the principal balance of the loan and the term of the loan. The data input module inputs the identifying data into the memory and records information indicative of the time payments received from the debtor toward payment of principal and interest on the loan. Additionally, the data input module inputs at least one entity which will receive a reoccurring annuity payment. The module for tracking the reduction in the principal balance of the loan also stores in memory the reduced principal balance in response to the time payments. The rate adjustment option module resets the rate of interest on the principal balance in response to the debtor's election. The rate of interest in the absence of the debtor's election and resetting is held fixed in the memory for the remaining term of the loan. The compensation module calculates and inputs back into memory an annual servicing income which is then used to calculate the percentage of annual servicing income which will be paid as annuity compensation. The compensation module also calculates a lump sum commission to be paid to the appropriate entity each time a modifiable mortgage, at the election of the debtor, is adjusted to a lower interest rate.

In still another aspect of the present invention, a method for managing the amortization of a loan to a debtor and applying an appropriate compensation package includes the steps of storing in a memory data identifying the debtor, the amount of the loan to the debtor, the principal balance of the loan, an initial rate of interest payable on the principal balance of the loan, the term of the loan, at least one entity which will receive annuity compensation, and at least one entity which will receive lump sum commission compensation in the event of a rate reduction on the mortgage; recording in memory information identifying time payments received from the debtor for principal and interest on the loan as the payments are made; tracking the reduction in the principal balance of the loan and storing in the memory the principal balance in response to the time payments; resetting the initial rate of interest on the principal balance to a new rate of interest in response to the debtor's election; calculating a lump sum commission payment to the appropriate entity each time the initial rate of interest is reset; maintaining the initial rate of interest for the balance of the term of the loan in the absence of the debtor's election and resetting of the rate of interest; calculating the percentage of annual servicing income to be paid to the appropriate entity as an annuity compensation; and paying the lump sum commission or annuity compensation to the appropriate entity.

Properly compensating a mortgage sales force to promote and sell modifiable mortgages in accordance with the systems and methods of the present invention will substantially benefit the mortgage sales force, mortgage servicers and mortgage investors. It is desirable to implement a compensation program which would pay a commission in the form of an annuity based on the servicing income, loan amount, principal balance and/or interest amount of the loan which can be offered separately or combined with a compensation program which calculates a lump sum commission payment upon the occurrence of a triggering event, such as each time a modifiable mortgage interest rate is decreased. Effectively implementing the present invention would help mortgage companies originate modifiable mortgages which, in turn, would promote long-term client relationships and reduced rates of pre-paid mortgages, thereby maximizing profit for the mortgage servicer and mortgage investor. Utilizing annuity compensation associated with a modifiable mortgage as set forth in the present application provides loan officers or other appropriate entities reoccurring income which may compensate for a lull in mortgage origination volumes during slower business periods.

BRIEF DESCRIPTION OF THE DRAWINGS

The accompanying drawings, which are incorporated herein and form part of the specification, help illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION OF THE PREFERRED EMBODIMENTS

The present invention relates to systems and methods for providing compensation to loan professionals associated with modifiable mortgages. More specifically, the present invention relates to providing a compensation program associated with modifiable mortgages that provides incentives to encourage a sales force to promote and originate modifiable mortgages.

In one embodiment of the present invention, a compensation system and method is designed to determine an annuity compensation to be paid to an appropriate individual or individuals, such as loan officers, branch managers and/or other appropriate parties, associated with the sale of a modifiable mortgage. In this embodiment, an annuity compensation amount is determined which is to be paid out to the appropriate individual as an annuity. The annuity compensation amount may be determined based on the mortgage servicing income associated with the modifiable mortgage, such as, for example, a defined percentage of the servicing income. The annuity compensation amount also may be determined based on the principal amount of the modifiable mortgage, principal balance of the modifiable mortgage, or mortgage interest associated with the modifiable mortgage. The annuity compensation amount also may be determined based on any combination of the servicing income, the principal amount, the principal balance, mortgage interest, or other amount associated with the modifiable mortgage.

Also in accordance with this embodiment, a payment schedule is determined for the payment of the annuity compensation amount to the individual in connection with the modifiable mortgage. This payment schedule may be at a predetermined payment interval over a predetermined period of time. In a non-limiting example, the payments may be paid once a month over the life or term of the modifiable mortgage. The payments also may be paid over other time intervals such as, for example, quarterly, semi-annually, annually or other suitable increment of time. The period of time over which the payments are to be paid may correspond to a number of mortgage payments to be made by the debtor. The period of time over which the annuity will be paid may be tied to the life of the modifiable mortgage, but it may be based on other time periods such as, for example, a set number of years that may or may not be tied to the life of the modifiable mortgage.

Also in accordance with this embodiment, an annuity payment amount is determined. The annuity payment amount is preferably determined based on the annuity compensation amount and payment schedule. The payment schedule preferably includes the number of payments to be made and the period of time over which the payments will be paid. The annuity payment amount may then be paid to the individual in connection with the modifiable mortgage according to the payment schedule.

In another embodiment of the present invention, a compensation system and method is designed to determine and pay a commission amount to an appropriate individual in connection with a modifiable mortgage based on a triggering event occurring after the origination of the modifiable mortgage. In one aspect of this embodiment, the triggering event may be a change in the interest rate of the modifiable mortgage. According to this embodiment, the individual would be paid a commission amount, for example, each time the interest rate is lowered for a modifiable mortgage originated by that individual. This aspect of the present invention provides a potential continuing revenue stream to the loan officer, for example, and compensation for an event, such as the lowering of an interest rate, that would typically result in compensation to a loan officer, e.g. such as in connection with a refinancing to achieve the lower interest rate.

In other aspects of this embodiment, the triggering event for payment of the commission amount may be events other than the lowering of an interest rate for a modifiable mortgage, such as, for example, various performance goals.

In yet another embodiment of the present invention, a compensation system and method is designed to determine and pay both annuity compensation and a commission amount to an appropriate individual in connection with the modifiable mortgage. As described above, the annuity payment amount is based on the annuity compensation amount and the payment schedule, and the commission amount is based on a triggering event. However, in accordance with the present invention, the compensation systems and methods can involve the annuity compensation or the commission compensation, or may involve both the annuity compensation and the commission compensation.

The compensation methods and systems in accordance with the present invention may be carried out by a lender, bank, mortgage servicer or other mortgage provider using a conventional computer or the like. Furthermore, because the compensation calculation system and process does not need to conduct highly complex calculations, the compensation systems and methods of the present invention may be implemented without the use of a computer.

Figure 1:
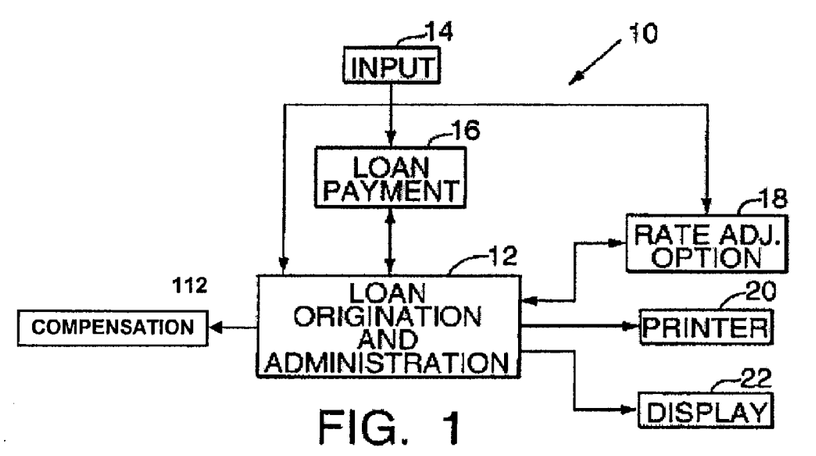
FIG. 1 is a schematic illustration of a system for managing the amortization of a loan and compensating an appropriate entity.

FIG. 1 is a schematic illustration of a system 10 with software programs for managing the amortization of a loan and calculating compensation to loan professionals in accordance with one embodiment of the present invention. The system 10 is a computing platform which operates in accordance with software provided on a storage medium, such as a conventional hard drive, to perform process steps as described herein. The computing platform includes other conventional computer peripheral devices necessary for its functionality. As is known in the art, a single conventional computer may perform steps in accordance with a plurality of software modules. Alternatively, the functions of several software modules may be performed by a plurality of computers.

Referring to FIG. 1, an input 14 serves as an interface between the system 10 and an operator or user (not shown) of the system 10, such as a loan officer. Input 14 may be a keyboard, mouse or other suitable device for responding to prompts generated by the software on a display 22. In response to user input actions, such as keystrokes and mouse movements, the input module generates identifying signals indicative of loan information. The input module also records time payment signals indicative of time payments received from the debtor for credits toward payment of principal and interest on the loan and escrow funds. Such time payment signals preferably comprise signals which identify the debtor and signals indicative of the amount of the time payment. The input module 14 generates and transmits the identifying signals to a loan origination and administration module 12. The loan origination and administration module 12 processes and stores the identifying signals in memory.

FIG. 1 also includes compensation module 112 which performs the determination of the compensation to the appropriate individual as described herein. In one aspect of the present invention, compensation module 112 calculates, for example, the annuity compensation amount, payment schedule, annuity payment amount, the commission compensation amount to be paid to the appropriate individual(s) based on input from the user. In another aspect of the present invention, the system 10 illustrated in FIG. 1 may be implemented by modifying existing systems for managing the amortization of loans. Thus, the present invention may be constructed without a significant investment in system architecture design and software development.

Figure 2:
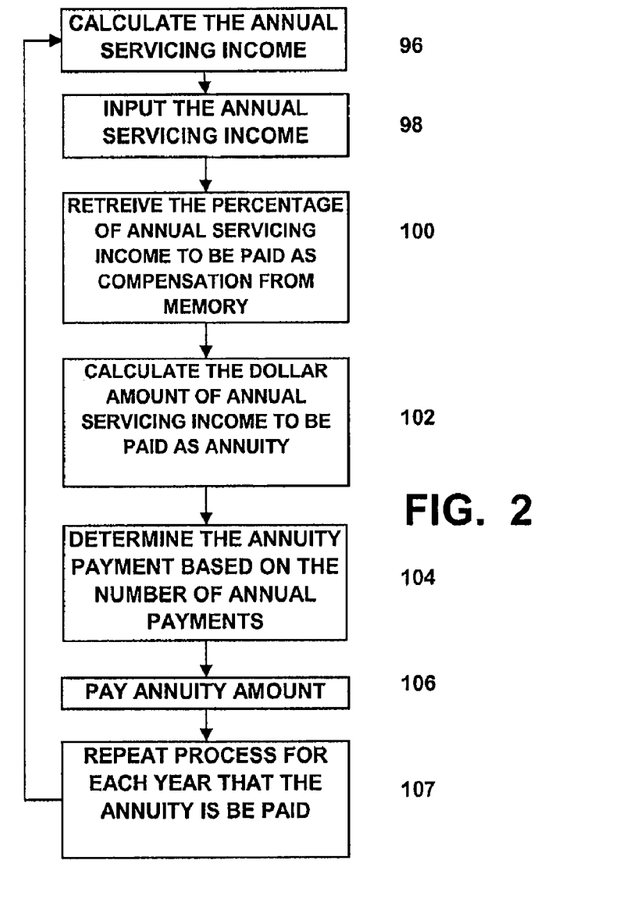
FIG. 2 is a flow chart describing the steps preformed by the compensation module of FIG. 1 in generating an annuity payment.

FIG. 2 is a flow chart illustrating an example calculation of the annuity compensation to be paid to an appropriate individual(s) for a given modifiable mortgage in accordance with one embodiment of the present invention. These computations may be made by an appropriately programmed computer, such as compensation module 112, as illustrated in FIG. 1. First, the annuity compensation amount is determined. In this embodiment, the annuity compensation amount is based on the servicing income. As illustrated in FIG. 2, the annual servicing income on the modifiable mortgage is calculated, as shown in step 96, and input into memory for future calculations, as shown in step 98. Next, the system 10 will retrieve the predetermined percentage of annual servicing income to be paid as annuity compensation from memory, as shown in step 100, such as, for example, 10%. Of course, other percentages may be used. Using this percentage, the system calculates the annuity compensation amount which is the amount of annual servicing income to be paid as an annuity, as shown in step 102. Next, the system 10 retrieves from memory the number of payments through which the total annuity is to be paid out in a year, as shown in step 104, for purposes of determining the annuity payment amount. For example, if the annuity is to be paid out in monthly installments, the number of payments in a year would be 12. The total annuity amount from step 102 is divided by the number of payments from step 104 and the resulting dollar amount is paid out to the appropriate entity, as shown in step 106, in accordance with the number of payments from step 104. This process is repeated for each year that the annuity is to be paid, such as, for example, the life of the loan or certain number of years, as set forth in step 107.

In another aspect of the present invention, the annual annuity amount could be the same or different from year to year. In one embodiment, the annuity amount is based on the servicing income which, in turn, can be based on the principal loan balance. For example, if the loan balance goes down, the service income also may go down. Under these circumstances, the lower servicing income may result in a lower annuity amount, which may result in a lower annuity payment amount paid to the individual. In another embodiment, the loan is an interest only modifiable mortgage and the annual servicing income and the annuity compensation do not fluctuate based on the principle amount of the modifiable mortgage during the term of the modifiable mortgage.

The following example is offered to illustrate, but not to limit the claimed invention. In this example, a borrower originates a modifiable mortgage through a loan officer for the amount of $400,000.00. The annual servicing income associated with this modifiable mortgage is calculated as follows. In this example, there are, for example, 50 basis points of annual servicing on the modifiable mortgage. Accordingly, the annual servicing income would be $400,000×50 basis points (0.005)=$2000.

The annuity paid to the loan officer is a percentage of the annual servicing income on the modifiable mortgage. In this example, the loan officer is to be paid 10% of the annual servicing income. Of course, this percentage could be larger or smaller at the discretion of the mortgage company. The total annuity paid to loan officer therefore would be (0.10× $2000) or $200. If it is determined that the loan officer is to be paid in monthly installments, for example, the loan officer would receive twelve monthly payments of $16.67. This annuity would be calculated and paid for each year for a specified period of time, such as, for example, the life of the loan or a certain number of years.

While the flow chart of FIG. 2 illustrates an embodiment of the invention where the annuity compensation amount is based on the servicing income of the modifiable mortgage, in other embodiments the annuity compensation amount may be based on the principal loan balance, the interest associated with the modifiable loan, or any combination of these.

Figure 3:
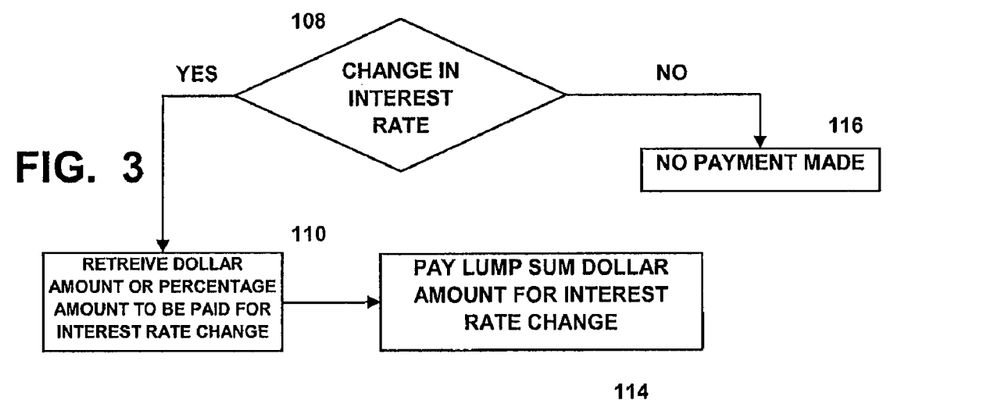
FIG. 3 is a flow chart describing the steps preformed by the compensation module of FIG. 1 in generating a commission payment triggered by a decrease in the modifiable mortgage interest rate.

In accordance with another embodiment of the present invention, a commission payment is calculated and paid out to the appropriate individual at various predetermined time intervals. In one embodiment, the commission payment is triggered by a specific event such as, for example, the lowering of the interest rate of a modifiable mortgage. FIG. 3 is a flow chart illustrating the calculation of the commission payment to be paid to the appropriate sales force member for a given modifiable mortgage in response to a lowering of the interest rate on a modifiable mortgage. These computations may be made, for example, in compensation module 112, as illustrated in FIG. 1. First, the system 10 checks for a specific triggering event, such as, for example, a change in the interest rate of a modifiable mortgage, as shown in step 108. If there has been no change, then no commission payment is made, as shown in step 116. However, if a change has taken place, the system 10 identifies the amount to be paid out to the appropriate sales force member as a commission, as shown in step 110. This commission amount can be a specific dollar amount stored in the memory or can be calculated based on, for example, a specific percentage of the original loan amount (e.g. 25 basis points). Finally, the commission for the change in interest rate is paid out to the appropriate sales force member, as shown in step 114.

The following example is offered to illustrate, but not to limit the claimed invention. In this example, the borrower originates a $400,000.00 modifiable mortgage having an initial interest rate of 6.5% through a loan officer. Two months later, the modifiable mortgage interest rate is adjusted down to 6.25% without refinancing. The compensation system of the present invention recognizes the change in interest rate and retrieves the percentage amount to be paid in the event of an interest rate change. In this example, the commission amount to be paid to the loan officer when the interest rate is reduced is 25 basis points of the loan amount. The commission is calculated by multiplying the modifiable mortgage amount by the percentage to be paid in commission. In this example, the commission to be paid to the loan officer is $400,000×25 basis points (0.0025), which yields a $1000 commission payout.

In one embodiment, each time the interest rate is changed on the modifiable mortgage, the commission percentage is retrieved, the commission is calculated, and the commission is paid out. In other embodiments, the triggering event for payment of the commission amount may be events other than the lowering of an interest rate for a modifiable mortgage, such as, for example, various performance goals or set time intervals, for example, based on the retention of the modifiable mortgage.

Figure 4:
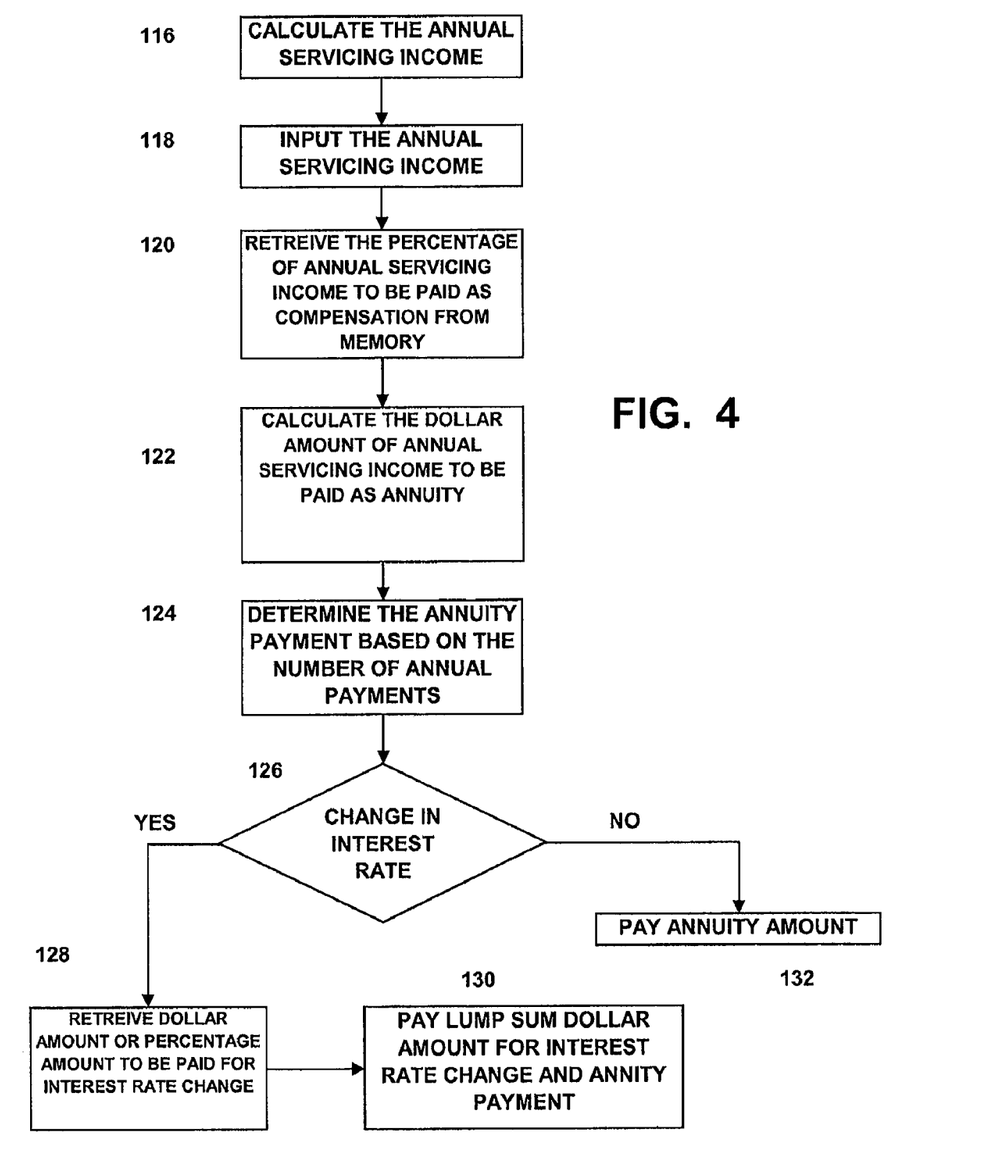
FIG. 4 is a flow chart describing the steps preformed by the compensation module of FIG. 1 in generating both an annuity payment and a commission payment triggered by a decrease in the modifiable mortgage rate.

In accordance with another embodiment of the present invention, the sales force member or other appropriate individual is compensated for originating a modifiable mortgage with both annuity compensation and a commission to be paid upon the occurrence of a triggering event. FIG. 4 is a flow chart illustrating the compensation system based on both the annuity and commission amount. As shown therein, the annual servicing income on the modifiable mortgage is calculated, as shown in step 116, and input into memory for future calculations, as shown in step 118. Next, the system 10 will retrieve the percentage of annual servicing income to be paid as compensation from memory, as shown in step 120. Using this percentage, the system calculates the amount of annual servicing income to be paid as an annuity, as shown in step 122. Next, the system 10 retrieves from memory the number of annual payments through which the total annual annuity is to be paid out. For example, if the annuity is to be paid out monthly, the number of annual payments would be 12, as shown in step 124. The dollar amount from step 122 is divided by the number of payments from step 124 and the resulting dollar amount is the annuity to be paid out to the appropriate entity.

Proceeding to the commission compensation steps illustrated in FIG. 4, the system 10 checks for a change in interest rate, as shown in step 126. If there has been no change, the already calculated amount from step 124 is paid to the appropriate entity, as shown in step 132. However, if there has been a change in the interest rate, the system 10 retrieves from memory the dollar amount or percentage amount to be paid out to the appropriate entity, as shown in step 128, and the dollar amounts from both steps 128 and 124 are paid out to that person, as shown in step 130.

The following example is offered to illustrate, but not to limit the claimed invention. In this example, a borrower originates a modifiable mortgage through the loan officer for the amount of $400,000.00. The annual servicing income associated with this modifiable mortgage is calculated as follows. In this example, there are, for example, 50 basis points of annual servicing on the modifiable mortgage. Accordingly, the annual servicing income would be $400,000×50 basis points (0.005)=$2000.

The annuity paid to the loan officer is a percentage of the annual servicing income on the modifiable mortgage. In this example, the loan officer is to be paid 10% of the annual servicing income. The total annuity paid to loan officer therefore would be (0.10×$2000) or $200. If it is determined that the loan officer is to be paid in monthly installments, for example, the loan officer would receive twelve monthly payments of $16.67. Further, during a given month, the interest rate on the borrower's modifiable mortgage drops from 6.5% to 6.25%. This interest rate change is recognized by the compensation system which then retrieves the percentage amount to be paid in the event of an interest rate decrease. In this example, the commission to be paid when the interest rate is reduced is 25 basis points. In this example, the commission to be paid to the loan officer is $400,000×25 basis points (0.0025), which yields a $1000 commission payout. Therefore, the total payout to the loan officer for the given month will be $1016.67.

In another embodiment of the present invention, the commission compensation would not be paid out in a lump sum. Rather, the commission payment would be paid out over an extended period of time in accordance with the annuity compensation payment schedule. For example, in the illustration of the present invention relating to the combined annuity and commission calculation, the commission compensation to be paid out was $1000 and the monthly annuity was $16.67. If, for example, there are 3 years left on the modifiable mortgage then the total number of annuity payments remaining would be 36. To extend the commission payment in accordance with the annuity payment schedule would mean that in this example the loan officer would receive a monthly payment of $44.45. This option would allow for a more consistent income stream for the loan officer, and in certain circumstances tax benefits.

While these embodiments have been described in connection with an appropriately programmed computer, the systems and methods described herein may be implemented without the assistance of a computer.

In yet another embodiment, the compensation systems and methods of the present invention are described in connection with a computer implemented loan amortization management system. By storing an executable system loan amortization management and compensation computer program in accordance with the present invention in a general purpose digital computer's memory, and executing the stored program, the stored program imparts loan amortization and compensation management functionality to the general purpose digital computer by changing the state of the computer's arithmetic logic unit when program instructions of the loan amortization and compensation management program are executed.

The present invention has applicability in managing loans to debtors, the transactions associated with those loans, and compensating loan professionals who work with the loans. This invention is valuable to lending institutions seeking to efficiently and competitively manage loans, particularly mortgage loans. The system is also valuable to debtors seeking to adjust the interest rate on their loans without having to go through a refinancing process. The system is also valuable to a portfolio lender, which is a lender who is using their own funds to lend to a consumer. In this case, they are the investor and the servicer at the same time. In general, the present invention is valuable to any company who compensates a person to originate modifiable mortgages using the systems and methods described herein.

Figure 5:
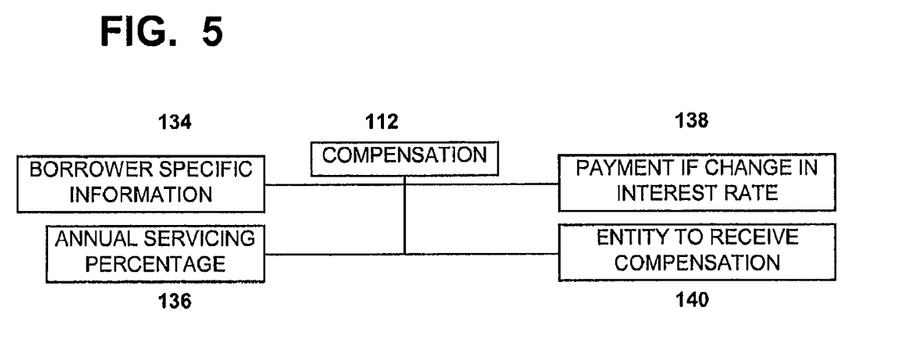
FIG. 5 is a schematic illustration of different types of information stored and processed by a loan origination and administration module of the system of FIG. 1.

FIG. 5 is a schematic illustration of the information represented within the loan origination and administration module 12, as illustrated in FIG. 1. At the time of loan origination, the module 12 receives and stores identifying signals indicative of the debtor 28, such as, for example, the amount of the loan to the debtor 29, the principal balance 30 of the loan, the fixed rate of interest 32 payable on the principal balance of the loan and the term 34 of the loan. During the course of the loan, module 12 may store other information such as, for example, the received time payments, as well as delinquencies in the time payments, as indicated by reference numeral 36. In a preferred embodiment, the module 12 further stores signals indicative of other required payments, such as taxes and insurance 38, which are paid along with the principal and interest on the loan and set aside in escrow.

Figure 6:
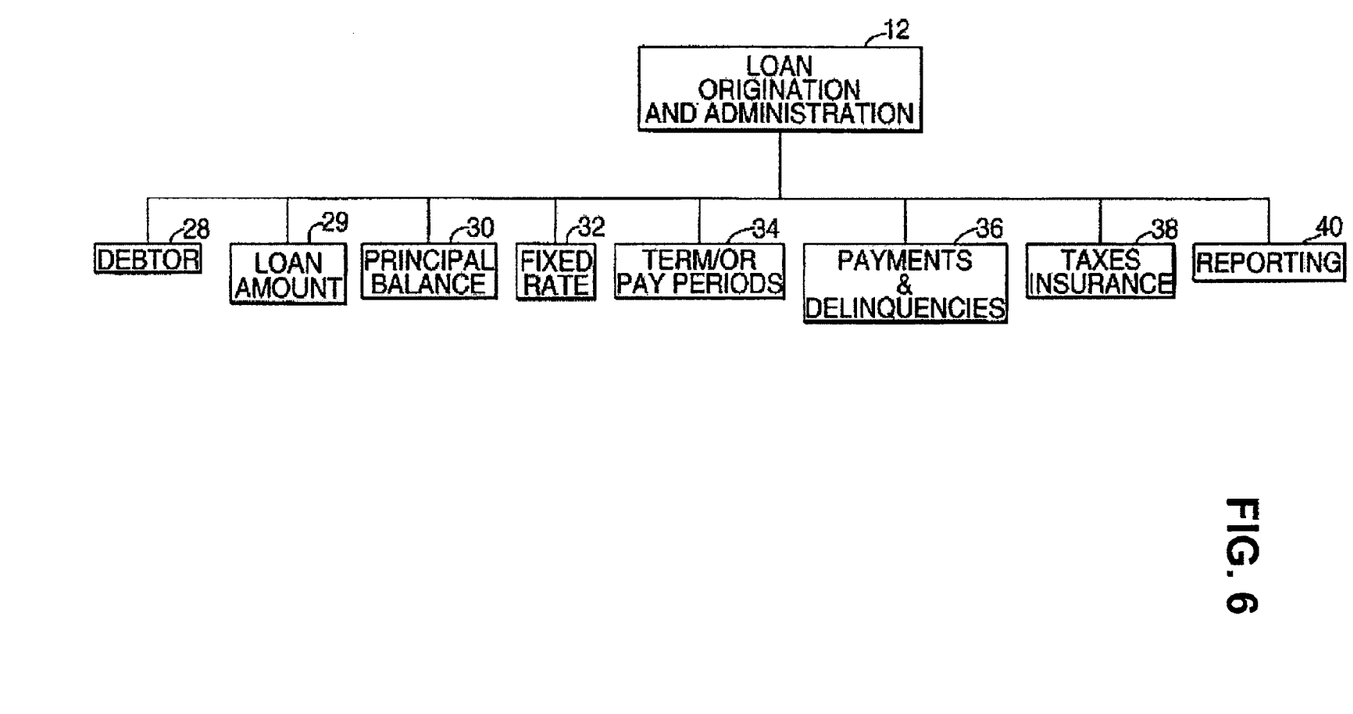
FIG. 6 is a schematic illustration of different types of information stored and processed by a compensation module of the system of FIG. 1.

Referring back to FIG. 1, the compensation module 112 is provided which processes and stores in memory information relevant to the compensation process as described herein. FIG. 6 is a schematic illustration of the information which may be received and stored in compensation module 112 in accordance with one embodiment of the present invention. For example, compensation module 112 may receive and store borrower specific information 134, the annual servicing percentage to be paid as an annuity 136, the commission payment if there has been a triggering event such as, for example, a change in the interest rate 138, and the entity to which compensation is to be paid 140. The compensation module 112 then uses this information to calculate the proper amount of compensation to be paid to the appropriate entity.

The loan origination and administration module 12 may also further generate signals indicative of reports 40 for presenting the identifying data, as illustrated in FIG. 5. A report is typically a monthly statement or year-end report and consists of a formatted table describing loan status information, such as previously received time payments, the current principal balance, when the next time payment is due and whether the time payment is delinquent. However, a report may present identifying data in other graphical and textual formats without departing from the scope of the present invention.

Referring again to FIG. 1, the report signals are displayed to the operator of the system 10 through conventional computer output devices. In one embodiment, a printer 20 and a display 22 receive the report signals from the loan origination and administration module 12 and the compensation module 112, and generate in dependence thereupon reports to the operator in textual or graphical form in a manner known in the art.

In accordance with the present invention, a rate adjustment option module 18 receives from the input module 14 election signals indicative of an election by the debtor to reset the interest rate of the loan. As described herein, the debtor typically makes such an election when prevailing interest rates have fallen significantly below the interest rate of the loan.

In response to the election signals, the rate adjustment option module 18 resets the rate of interest 32 on the principal balance 30 by adjusting the signals indicative of the rate of interest. The rate adjustment option module 18 preferably adjusts the interest rate signals in accordance with signals stored in memory in a table of current rates, or yields. The rates in the table are based upon a known index, such as the Federal National Mortgage Association's required net yield on mortgage loans, and, in one embodiment of the invention, the current rates in the table are determined from the index value by adding a margin established by the lending institution and then rounding the rate to the nearest ⅛th of a point (0.00125). The table of current rates in the memory includes multiple rates, or yields, for different types of mortgage loans, such as a 15-year fixed rate, a 30-year fixed rate, a jumbo fixed rate, an FHA mortgage rate and so on. If the loan to the debtor is a given type of mortgage loan which corresponds to a rate in the table, the rate adjustment option module 18 resets the rate of interest based upon the current rate or yield corresponding to the given type of mortgage loan held by the debtor.

Figure 7:
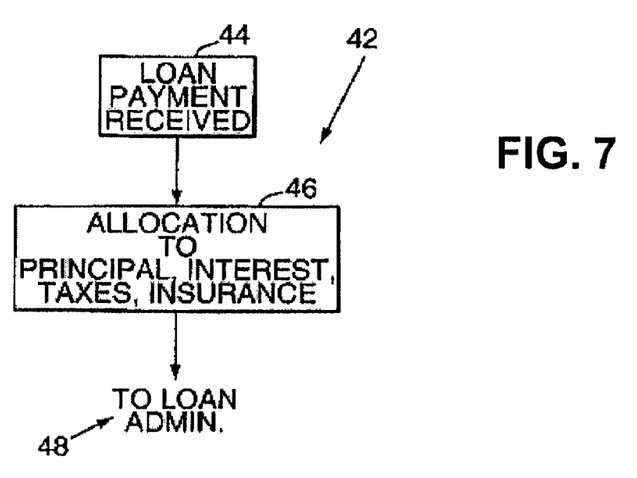
FIG. 7 is a flow chart describing steps performed in processing a received time payment.

FIG. 7 shows a flowchart 42 which describes the steps performed in processing a received time payment in the loan payment module 16 (FIG. 1). The module receives the time payment signals from the input module 14, as shown by step 44. The loan payment module 16 determines the appropriate allocation of the time payment between principal and interest, in accordance with known amortization methods, and allocates taxes, insurance and other escrow items in accordance with preset payment plans, as shown by step 46. The appropriate allocation of a payment to principal and interest typically depends on the principal balance, the interest rate, and the stage or remaining term of the loan. Accordingly, the loan payment module 16 receives signals indicative of the principal, rate and term from the loan origination and administration module 12, and generates in dependence thereupon signals indicative of the amount by which to reduce the principal balance of the loan. As shown by step 48, the loan origination and administration module 12 receives the principal reduction signals and tracks the reduction in the principal balance by the remaining term or number of payment periods 34 is also decremented time payments. Reduced principal signals 30 are then stored in memory awaiting the next time payment.

Figure 8:
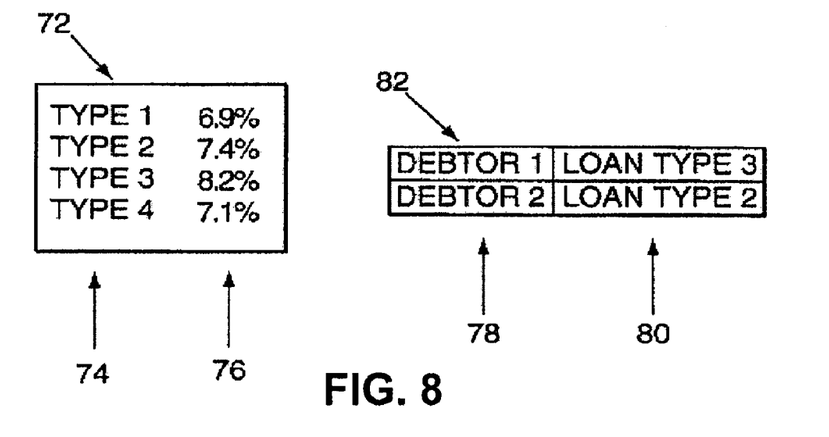
FIG. 8 is a chart which illustrates an example of a table of current interest rates.

FIG. 8 illustrates an example of a table 72 of current rates 76. Each of the set of rates 76 is associated with one of a set 74 of types of mortgages. Other identifying information 82 in memory indicates the debtor 78 and the type of mortgage 80 held by the debtor 78. If the debtor's mortgage 80 is, for example, a "Type 3," then the debtor's rate of interest set by the rate adjustment option module 18 would be the interest rate in the set 76 which corresponds to a "Type 3" mortgage, that is, the rate 8.2%.

As described herein, the time payments are due at predetermined payment intervals during the term of the loan, such as every month. In a preferred embodiment, the rate adjustment option module 18 resets the rate of interest to become effective at the beginning of a payment interval, typically the first payment interval, after the debtor's election. For example, if payment intervals start on the first day of each month and the debtor makes his election on Sep. 1, 1996, the reset rate of interest becomes effective Oct. 1, 1996 and the first time reflecting the new rate would be due on Nov. 1, 1996 since interest is always paid in arrears.

Figure 10:
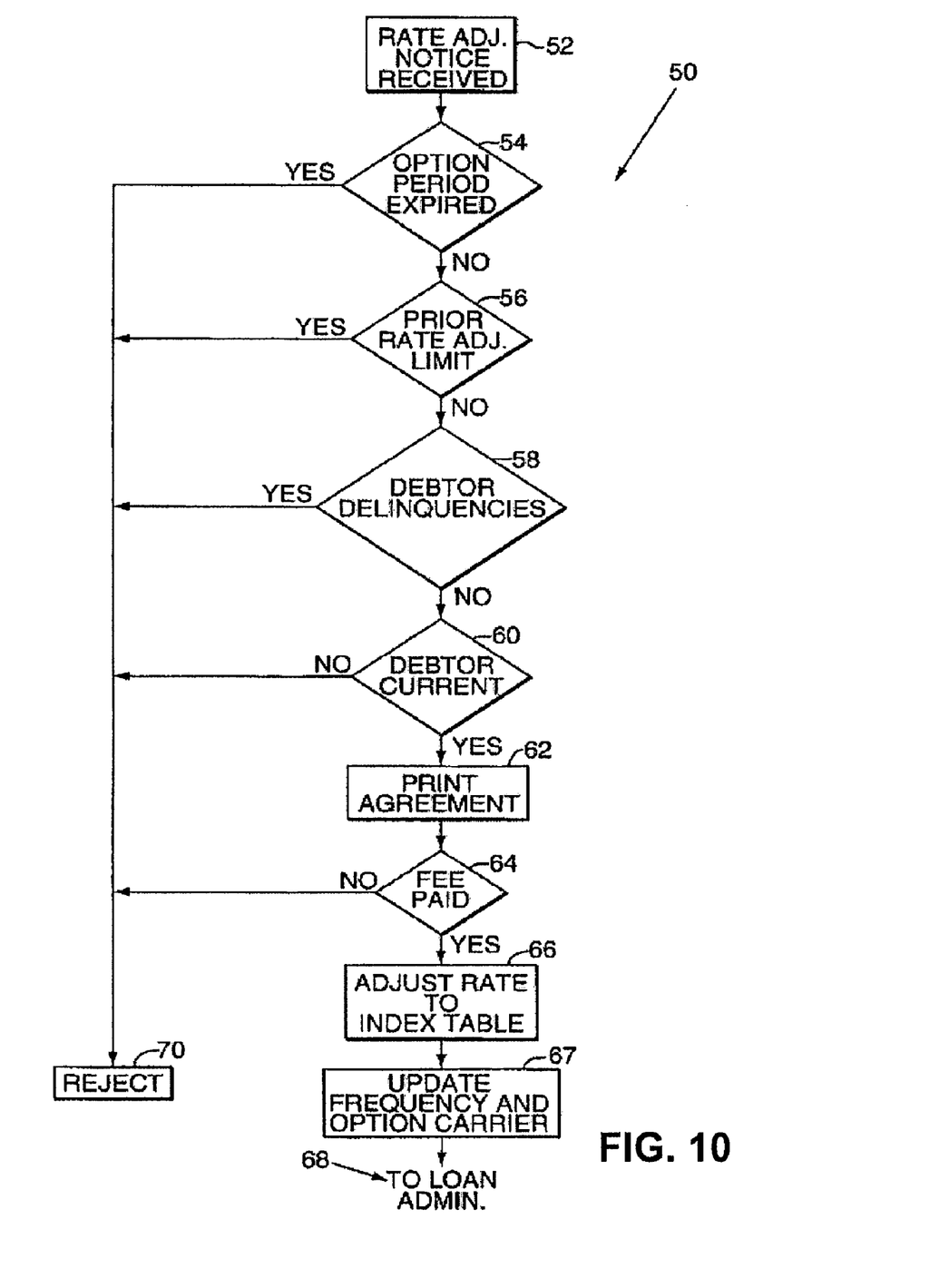
FIG. 10. is a flow chart describing steps performed by the rate adjustment option module of FIG. 1.

It is preferred that resetting of the interest rate is not permitted at all times, but is permitted in accordance with prescribed restrictions described herein. FIG. 10 illustrates a flow chart 50 which describes steps performed by the rate adjustment option module 18 (FIG. 1) in receiving an election to reset a rate.

It is preferable, but not required, to limit rate resetting to prescribed periods of time, rather than at any time during the term of the loan. The rate adjustment option module 18 limits the resetting of the rate of interest to a prescribed option period within the term of the loan. The option period is preferably early in the term, and furthermore starts at the beginning of the term. A typical option 15 year or a 30 year mortgage loan is the period extending three years from the beginning of the term. Upon receiving signals indicative of a debtor election, as shown by step 52, the rate adjustment option module 18 determines whether the option period has expired, as shown by step 54. If so, rate adjustment is rejected, as shown by step 70. Otherwise, the process of qualifying the debtor and the election continues.

The rate adjustment option module 18 also limits the number of times the rate of interest is reset within the term of the loan, as well as the frequency of resetting the rate. For example, the rate may be reset a maximum of four times during the term of the loan, and at a frequency of not more than twice per year. The memory stores signals indicative of the number of permitted elections and the frequency of permitted elections, as well as signals indicative of past elections and when the elections were made. After determining at step 54 that the option period has not expired, the rate adjustment option module 18 determines whether the number of permitted elections or the frequency of permitted elections has been exceeded, as shown by step 56. If so, rate adjustment is rejected, as shown by step 70.

If a debtor has not made the currently due or, previous time payments on a timely basis, the delinquencies are recorded in memory (see FIG. 5 at 36), and he may not be granted the benefit of a rate reduction. Accordingly, the rate adjustment option module 18 limits the resetting of the rate of interest in response to recorded delinquencies or a currently due time payment. Rate adjustment may be prohibited if any payments are delinquent or if a prescribed number of late payments is exceeded. After determining at step 56 that the number and frequency of permitted elections has not been exceeded, the rate adjustment option module 18 ascertains from memory whether the debtor is delinquent, as shown by step 58. Similarly, the rate adjustment option module 18 ascertains whether the debtor has made a time payment for the current payment interval, as shown by step 60. If the debtor is either delinquent or not current, rate adjustment is rejected, as shown by step 70.

If the debtor is not delinquent and is current, the system 10 (FIG. 1) prints a contract or agreement setting out the new payment terms including the new rate of interest, the new time payment and the new term, if applicable, and authorizing the lending institution to change the interest rate, as shown by step 62. The debtor may typically be required to sign the agreement and pay a fee for the rate reduction. Once the system receives signals indicative of the fee payment, as shown by step 64, the rate is adjusted, as shown by step 66. The loan administration module 12 (FIG. 1) then receives the adjustment information and processes new time payments in conjunction with the loan payment module 16 based upon the new interest rate and other changes, as shown by step 68.

In response to the debtor's election and the resetting of the rate of interest, the amount of the required time payment or the remaining term of the loan may be reduced, or both may be adjusted. The operator selects what is to be reduced via the input module 14.

Figure 9:
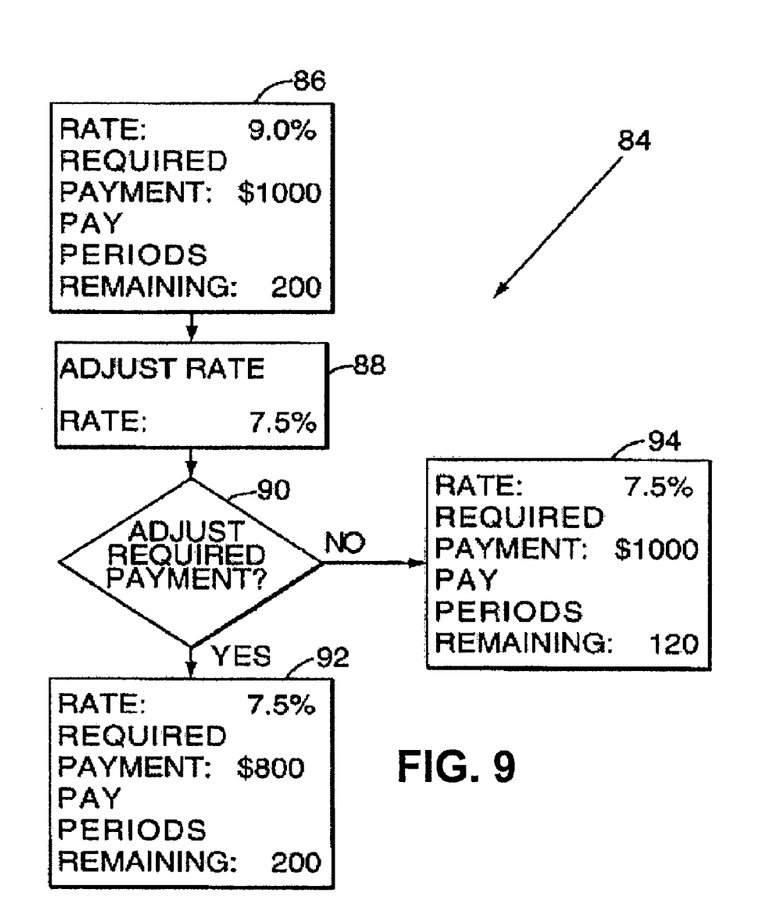
FIG. 9 is a flow chart which illustrates changes which occur in a sample loan upon an election of a debtor.

FIG. 9 shows a flow chart 84 which illustrates a payment/term routine that in one embodiment of the invention may be interposed between the rate adjustment module 18 as outlined in FIG. 10 and the loan origination and administration module 12 in FIG. 5. The payment/term routine changes either the time payment or the balance of the loan term in response to the debtor's newly elected rate of interest. Step 86 shows the rate of interest, required time payments and number of required time payments remaining for the loan before the election and rate change. Step 88 shows the rate after election and rate changes in accordance with the adjustment module. At step 90, the system permits the debtor to choose to reduce the amount of the required time payment or the remaining term of the loan. If he chooses to reduce the required time payment, then the payment is reduced and the remaining term is unchanged, as shown by step 92. The reset required time payment amount depends on the reset rate of interest, the remaining term of the loan and principal balance of the loan, as is known in the art. In response to the reset time payment amount, the loan payment module 16 allocates received time payments between principal and interest in accordance with known amortization methods.

If the debtor instead chooses to reduce the remaining term, then the remaining term is reduced but the required time payment is unchanged, as shown by step 94. The reset term depends on the reset rate of interest, the required time payment and the principal balance of the loan to the debtor. In response to the reset term, the loan payment module 16 re-allocates the amount of the time payments between principal and interest in accordance with known amortization methods.

In the absence of the debtor's election and resetting, the loan rate of interest is held fixed in the memory for the remaining term of the loan. Thus, without an election, the system 10 (FIG. 1) accepts and processes signals indicative of time payments as if the system 10 were processing payments on a fixed-rate loan.

As described hereinabove, the computing platform on which the present invention is implemented receives input signals indicative of user input information and user selections, and transforms those input signals into signals for resetting the otherwise fixed rate of interest. The system also processes time payments and produces reports at monthly or year-end intervals, which describe loan status information. The reports are typically presented in textual or graphical form to a user by means of the display 22 or a paper print-out from the computer printer 20. The computing platform therefore physically transforms the signals indicative of user input information and user selections.

According to an embodiment of the invention as described herein, a system and method for managing the amortization of a loan to a debtor and applying an appropriate compensation package includes the steps of storing in a memory data identifying the debtor, the amount of the loan to the debtor, the principal balance of the loan, an initial rate of interest payable on the principal balance of the loan, the term of the loan, at least one entity which will receive annuity compensation, and at least one entity which will receive lump sum commission compensation in the event of a triggering event, such as a rate reduction on the mortgage. The system and method further includes recording in memory information identifying time payments received from the debtor for principal and interest on the loan as the payments are made and tracking the reduction in the principal balance of the loan and storing in the memory the principal balance in response to the time payments. The system and method also includes resetting the initial rate of interest on the principal balance to a new rate of interest in response to the debtor's election, calculating a lump sum commission payment to the appropriate entity each time the initial rate of interest is reset and maintaining the initial rate of interest for the balance of the term of the loan in the absence of the debtor's election and resetting of the rate of interest. The system and method additionally includes calculating the percentage of annual servicing income to be paid to the appropriate entity as annuity compensation and paying the lump sum commission or annuity compensation to the appropriate entity.

According to one objective of the present invention, the compensation systems and methods seek to achieve a desirable balance between the interests of the mortgage investor, mortgage servicer, mortgage originator and the mortgage customer. In one example, in connection with paying an annuity to the loan origination force, it may be desirable to provide sufficient returns to the mortgage servicing or mortgage origination company. A system and method for achieving this, in accordance with one embodiment of the present invention, is described as follows.

A mortgage customer typically pays closing costs when he or she obtains a mortgage loan. However, mortgages are available where the closing costs are paid by the mortgage lender, i.e. a no closing cost mortgage. The mortgage customer is aware that if closing costs are paid by the mortgage lender, the customer will have to pay a higher interest rate. For example, a customer typically pays from approximately 0.25%-0.625% above par in order to have his or her closing costs paid by the lender. In accordance with one aspect of the present invention, this excess percentage can be used to pay the mortgage origination force an annuity and/or a commission amount based on a triggering event in connection with a modifiable mortgage.

For example, in one embodiment, the annuity compensation amount is based on the interest amount associated with the difference between the par interest rate sought by the lender and the above par interest rate the borrower is willing to pay for a no closing cost modifiable mortgage. In a non-limiting example, the borrower originates a $400,000.00 modifiable mortgage having an initial interest rate of 6.5% through a loan officer. In this par plus loan, the par interest rate sought by the lender is 6.125% and the "above par" interest rate is 6.5%. The borrower is willing to pay the 0.375% above par for the no closing cost option in connection with the modifiable mortgage. In this embodiment, the interest amount associated with this 0.375% paid by the borrower is the annuity compensation amount to be paid to the loan officer in connection with the origination of the modifiable mortgage. In this example, the 0.375% of $400,000 loan amount creates a $1,500 annuity compensation amount. If it is determined that the loan officer is to be paid in monthly installments, for example, the loan officer would receive twelve monthly payments of $125.00. This annuity would be calculated and paid for each year for a specified period of time, such as, for example, the life of the loan or a certain number of years. If the modifiable interest rate is adjusted down without refinancing at the election of the borrower, the interest rate is still "above par" and creates an interest amount that may be used as the annuity compensation amount, as discussed herein. Further, the lender does not have pay out any additional closing costs in connection with this rate modification because there is no refinance of the loan. The compensation system in accordance with this embodiment of the invention is advantageous in that the annuity compensation amount does not come from the servicing income and, therefore, the mortgage servicing company, but from the mortgage customer who benefits from not having to pay closing costs to receive a lower interest rate.

In accordance with still other aspects of the present invention, an algorithm for structuring a modifiable mortgage interest rate and paying the modifiable mortgage origination sales force an annuity is disclosed. For example, structuring a modifiable interest rate and paying a sales force an annuity may be achieved according to the following formula.

Formula A

P=par interest rate

X=% added to the par interest rate to cover the cost of the customer's closing costs.

Modifiable interest rate calculation=P+X

Z=annuity percentage paid to sales force as appropriate incentives to originate modifiable mortgages Z=a percentage of X In a non-limiting example of the following formula, the par interest rate is 8% (P) and the percentage added to the par interest rate to cover the cost of the customer's closing costs is 0.375% (X). The par interest rate (P) and the above par interest rate (X) can be determined, for example, from published interest rates for traditional no closing costs mortgages. In this example, the 8.375% interest rate provides a credit from the mortgage investor to customer for $6000 of closing costs. If the interest rates drop ½%, the par interest rate is now 7.5% (P). If the customer elects to lower the interest rate of the modifiable mortgage, the customer is offered a modification rate of 7.875% (P+X), without going through a refinance. In connection with this rate modification, the investor is paid 0.375% (X) above par without paying an additional $6000 for closing costs. In this example, the investor pays the mortgage company a percentage of the excess 0.375% (X) to be paid to the origination force as an annuity, such as, for example, 66.7% (Z). In this example, 0.250% (X) is paid to the origination force as an annuity and the investor still receives 0.125% (X) above par without paying another $6000.

As illustrated above, providing a closing cost credit to the customer provides the investor a higher rate of return. In one embodiment, once the investor has recouped his or her outlay for the closing costs, the higher yield can then be used to pay the origination force an annuity. Timeframes can be set on when the annuity begins for the origination sales force.

Investors in mortgage backed securities pay a monthly servicing fee to a servicing company, which can be a bank, mortgage company, third party servicing company or entity, to collect the monthly payment from the mortgage consumer. Mortgage servicing companies look to this servicing fee as their ongoing revenue to remain profitable in the mortgage industry. Servicing mortgages can be very risky when interest rates drop because loans are refinancing to other mortgage and servicing companies. In accordance with one aspect of this invention, investors only have to pay the normal servicing fee associated in the mortgage industry. Through increased retention rates, and avoiding paying closing costs each time a loan is refinanced, provides the investors with a higher rate of return than what is offered through traditional mortgage backed securities. The above par rate of return is achieved using the formula described above which also provides the excess annuity fee which will be paid as incentive to the mortgage origination sales force.

Although the invention has been shown and described with respect to a preferred embodiment thereof, it would be understood by those skilled in the art that other various changes, omissions and additions thereto may be made without departing from the spirit and scope of the present invention. For example, the display may be a computer monitor which is connected via a global computer network to the above-described system for managing the amortization and compensation of a loan. The displayed reports are thereby available to a user who is remote from the system. Accordingly the present invention has been described in several preferred embodiments by way of illustration rather than limitation.

What is claimed is:

1. A method for managing the amortization of a modifiable mortgage to a debtor and compensating an entity in connection with the origination of the modifiable mortgage in a data processing system, a method comprising the steps of:

a. storing in a memory data identifying the debtor, an amount of the modifiable mortgage to the debtor, a principal balance of the modifiable mortgage, an initial rate of interest payable on a principal balance of the modifiable mortgage and a term of the modifiable mortgage;

b. recording in memory information identifying time payments received from the debtor for principal and interest on the modifiable mortgage as payments are made;

c. tracking and outputting a reduction in the principal balance of the modifiable mortgage and storing in the memory the principal balance in response to the time payments;

d. resetting a first interest rate on the principal balance to a new interest rate in response to an election by said debtor;

e. maintaining said first interest rate for the balance of the term of the modifiable mortgage in the absence of said debtor's election;

f. calculating an annual servicing income based on the servicing income associated with servicing the modifiable mortgage;

g. calculating annuity compensation based on a percentage of at least one of said principal balance of the modifiable mortgage or said annual servicing income;

h. calculating a commission compensation to be paid upon an occurrence of a triggering event after an origination of the modifiable mortgage; and i. designating and paying the annuity compensation to the entity in connection with the origination of the modifiable mortgage in accordance with said payment schedule and paying the commission compensation upon the occurrence of said triggering event.

2. The method according to claim 1, wherein the annuity compensation is paid monthly, quarterly, semi-annually, or annually.

3. The method of claim 1, wherein said triggering event is the resetting of the interest rate of the modifiable mortgage in response to the election by said debtor.

4. The method of claim 1, wherein the modifiable mortgage is an interest only modifiable mortgage and the annual servicing income and the annuity compensation do not fluctuate based on the principle amount of the modifiable mortgage during the term of the modifiable mortgage.

* * * * *